United States Patent [19]
Tseng et al.

[11] Patent Number: 5,935,033
[45] Date of Patent: Aug. 10, 1999

[54] MULTI-STAGE SPROCKET ASSEMBLY FOR BICYCLE

[75] Inventors: Rock Tseng, Hsinchu; Sheng-Sheuan Hsu, ChungLi, both of Taiwan

[73] Assignee: Tracer Company, Ltd., Ta-Yuan, Taiwan

[21] Appl. No.: 08/949,002

[22] Filed: Oct. 10, 1997

[30] Foreign Application Priority Data

Aug. 1, 1997 [TW] Taiwan ................................ 86213070

[51] Int. Cl.$^6$ ............................................. F16H 9/00
[52] U.S. Cl. ........................ 474/160; 474/155; 474/116
[58] Field of Search .................................. 200/236, 237, 200/238; 474/116, 152, 155, 160

[56] References Cited

U.S. PATENT DOCUMENTS

| | | | |
|---|---|---|---|
| D. 35,193 | 10/1901 | Dodge | 474/152 |
| 3,956,943 | 5/1976 | Yamasaki | 474/160 |
| 4,348,200 | 9/1982 | Terada | 474/160 |
| 5,066,264 | 11/1991 | Romano | 474/152 |
| 5,162,022 | 11/1992 | Kobayashi | 474/155 |
| 5,192,250 | 3/1993 | Kobayashi | 474/160 |
| 5,458,543 | 10/1995 | Kobayashi | 474/160 |
| 5,503,598 | 4/1996 | Neuer et al. | 474/160 |

*Primary Examiner*—Lanna Mai
*Assistant Examiner*—William R. Zimmerli
*Attorney, Agent, or Firm*—W. Wayne Liauh

[57] ABSTRACT

An improvement of multi-stage sprocket assembly for bicycle includes at least a small sprocket and a large sprocket. The large sprocket includes at least two different sets of teeth. The large sprocket defines a radial second center line across the thickness thereof while the first set of teeth each defines a first center line across the teeth crest and parallel to the second center line. The first center line is moved away from the second center line in an opposite direction of the small sprocket. The second set of teeth includes at least two consecutive special teeth. The first special tooth has a recess formed under the root in a lateral side facing the small sprocket to avoid interference with the chain during shifting movement. The second special tooth has its first center line moving away from the second center line of the large sprocket toward the small sprocket for engaging with the chain at a small rotation angle without raising the chain or changing the tension of the chain during shifting movement. An additional third special tooth with a truncated top portion may be provided next to he second special tooth to smooth shifting movement either for shifting up or down or at any shifting angle. Shifting movement may therefore be accomplished at the second special tooth without interference with the chain.

13 Claims, 12 Drawing Sheets

MULTI-STAGE SPROCKET ASSEMBLY FOR BICYCLE

BACKGROUND OF THE INVENTION

1. Field of the Invention

This invention relates to an improvement of multi-stage sprocket assembly for bicycle, the assembly including at least a small sprocket and a large sprocket, the large sprocket being formed with a plurality of specially designed teeth for assisting a shifting movement of a chain between the small sprocket and large sprocket.

2. Description of the Prior Art

In a multi-stage sprocket assembly of a bicycle which has a derailleur, to shift the chain from a small sprocket to a large sprocket, the large sprocket usually has to be specially structured to ensure a reliable shifting movement. U.S. Pat. No. 5,192,248 (Nagano) discloses a large sprocket embodiment which has a shift assist projection or a split tooth projection for engaging with an outer side face of a link plate of the chain so that the chain can be lifted upward for shifting movement. However such a structure costs higher. The split tooth also weakens tooth strength and has negative impact on safety. U.S. Pat. No. 5,413,534 (Nagano) teaches another sprocket structure which has chain support projections formed on the side surface of the large sprocket for picking up the chain radially outward during shifting movement. The large sprocket has to turn a large angle for shifting movement. As the chain is subject to heavy loading, the chain support projection easily gets worn out after long time of use, and thus will adversely affect shifting movement.

Figure 1A:
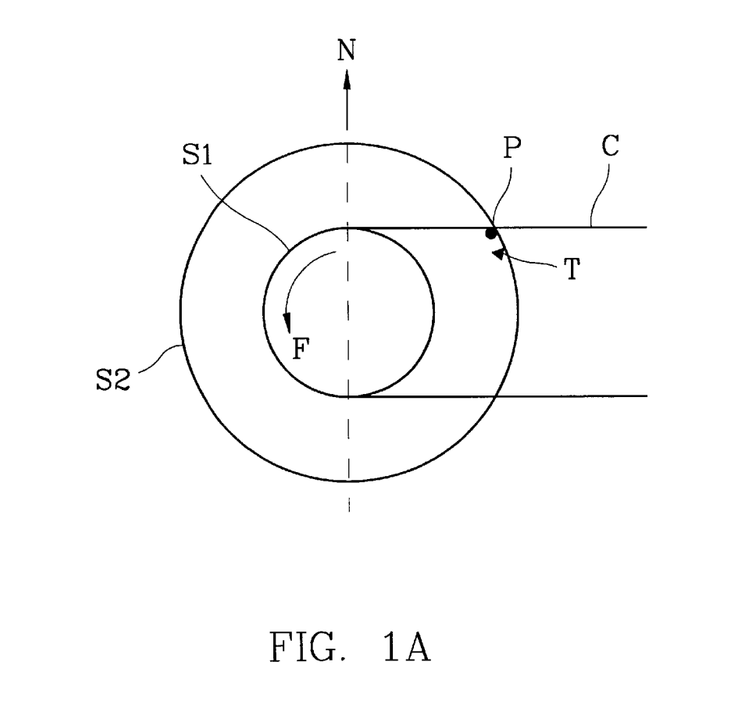
FIGS. 1A and B are the diagrams of sprockets tuning angle for shifting movement used in the prior art.
Figure 1B:
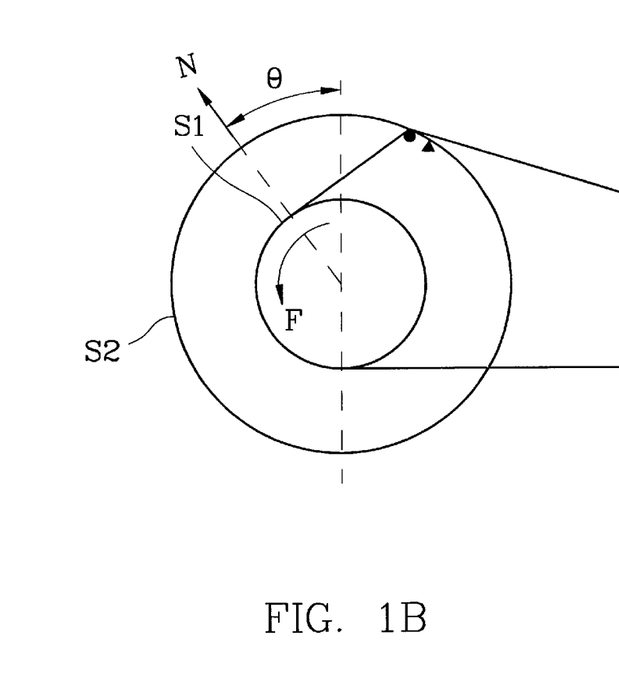

The two prior arts set forth above need the sprockets to turn a large angle and to raise the chain radially outward for shifting movement. FIGS. 1A and 1B illustrate the principle of such a shifting movement. S1 represents the small sprocket, S2 is the large sprocket, C is the chain, F is the driving direction, N is the sprocket position when the shifting movement starts, P is the shift assist projection or chain support projection disposed on the large sprocket. During shifting movement, the projection P raises the outer side surface of the link plate of the chain C radially outward while the inner face of the link plate is being suspended without support. The sprockets S1 and S2 turn a large angle θ for allowing the next outer side face of the link of the chain C to engage with the large sprocket S2 to complete the shifting movement.

As the chain C is structured alternately by a pair of inner link plates and a pair of outer link plates, there are two different shifting paths for engagement between the chain C and sprocket S1 and S2. The difference of these two paths is resulting from the interchange of positions of the inner link plate and the outer link plate. Conventional method of dealing with these two shifting paths is to allocate two sets of shifting teeth. When the first set of teeth does not achieve shifting movement successfully, the sprockets continuously rotate until the second set of the teeth are positioned properly to perform the shifting movement. The shifting efficiency is therefore dropped. Furthermore, conventional shifting movement structure mostly takes into account only for shifting from the small sprocket up to the large sprocket. How to shift from the large sprocket to the small sprocket is often being neglected, and thus causes undesirable shifting movement when shifting down is performed.

SUMMERY OF THE INVENTION

It is therefor an object of this invention to provide an improvement of multi-stage sprocket assembly for bicycle such that there is no need to catch or raise the outer link plate of the chain upward during shifting movement, i.e., the shifting movement may be achieved at a shorter time and at a small sprocket rotating angle without raising the chain or changing the tension of the chain.

It is another object of this invention to provide an improvement of multi-stage sprocket assembly for bicycle such that either shifting from the small sprocket to the large sprocket (i.e., shifting up) or from the large sprocket to the small sprocket (i.e., shifting down) may be easily and effectively performed by means of special teeth structure of this invention.

The improvement of the sprocket according to this invention includes at least a large sprocket and a small sprocket each with different teeth number. The large sprocket includes at least two sets of different teeth. The first set of teeth are regular teeth each has a first center line running vertically across the crest of the tooth and is offset from a second center line of the sprocket. The first center line is located at the opposite side of the small sprocket to avoid the chain engaging with the first set of teeth during shifting. The second set of teeth includes a plurality of consecutive special teeth which includes at least a first special tooth, a second special tooth and a third special tooth. The first special tooth has a recess formed in a lateral side facing the small sprocket and below the root to avoid interference of the chain against the large sprocket during shifting movement. The second special tooth has a third center line running vertically across the tooth crest with the third center line offset and moving toward the small sprocket so that the chain may easily engage with the second special tooth without having to raise the chain during shifting movement. The third special tooth is formed with a truncated top portion and is located next to the second special tooth so that during shifting movement the chain may always be engaged or disengaged easily with the second special tooth whether it is shifting up or shifting down, or whatever the engaging angle of the sprockets happens to be.

BRIEF DESCRIPTION OF THE DRAWINGS

The invention, as well as its many advantages, may be further understood by the following detailed description and drawings in which.

DETAILED DESCRIPTION OF PREFERRED EMBODIMENTS

Figure 2:
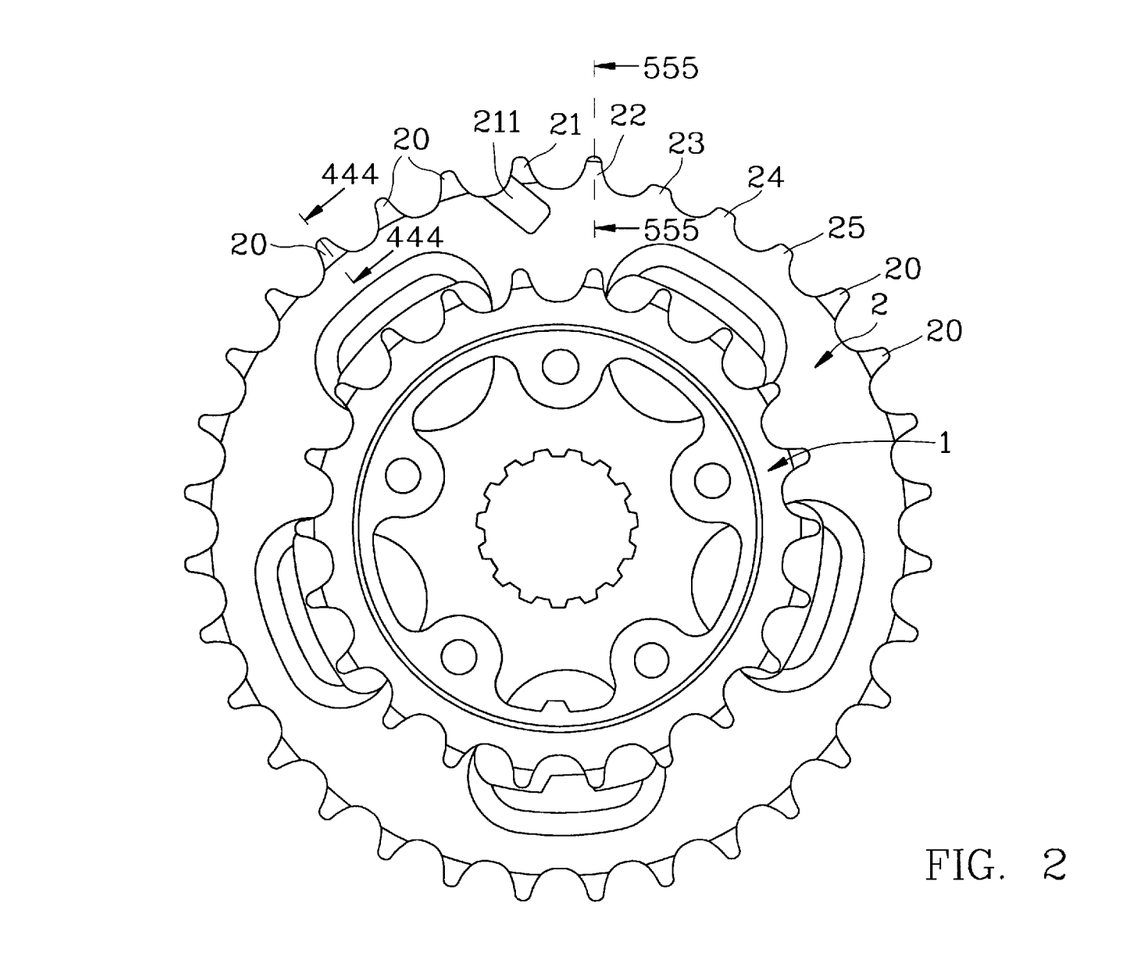
FIG. 2 is a front view of this invention.

Referring to FIG. 2, a sprocket assembly in accordance with a preferred embodiment of the present invention comprises at least a small sprocket 1 and a large sprocket 2. In the large sprocket 2, there are at least two sets of different teeth. The first set of teeth 20 are regular teeth and are formed with same structure. The second set of teeth are specially designed, which include at least three special teeth 21, 22, and 23 positioned consecutively.

It is noted that following illustrated embodiments have in general similar structure like the one described above. Therefore same numerals are used for similar type of elements. It is also noted that, in the following embodiments shown in FIGS. 3, 4A, 4B and 4C, "the second center line B" is generally used for representing a center line of the thickness of the large sprocket 2 and is running across the large sprocket 2 radially, while "the first center line A" is generally used for representing a center line of a tooth crest and is parallel to the line B.

Figure 3:
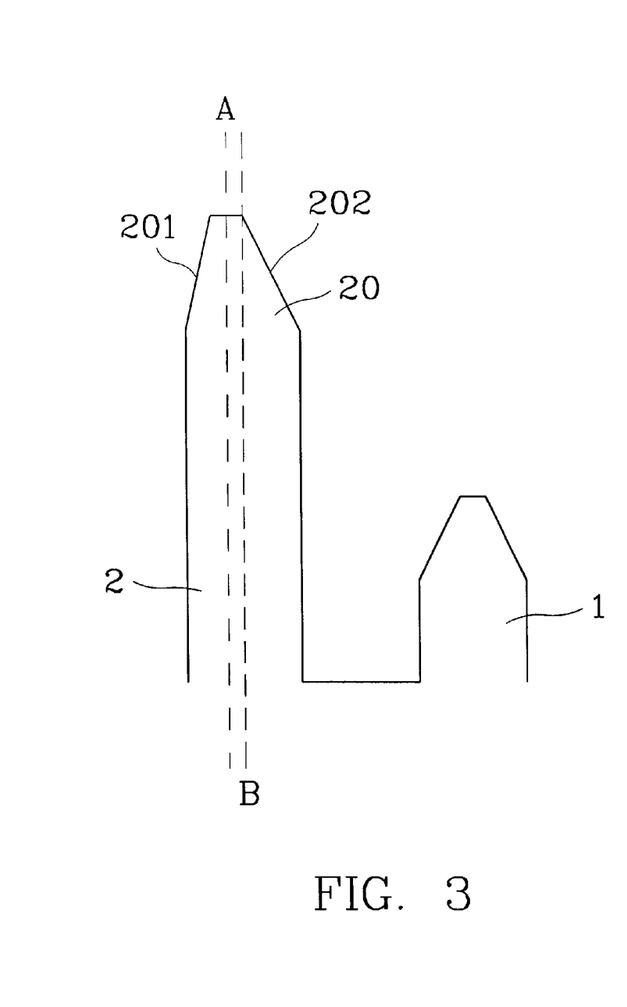
FIG. 3 is a sectional view of the first set of teeth(taken along line 444—444 of FIG. 2).

Referring to FIG. 3, in the first set of teeth 20, a first center line A runs vertically across the crest of the tooth and is offset from a second center line B of the large sprocket 2, and is at an opposite direction against the small sprocket 1. Each of the first set of teeth 20 has a large cutting edge 202 on a lateral side facing the small sprocket 1. Each of the teeth 20 has another cutting edge 201 on another lateral side opposite to the small sprocket 1 with a smaller angle than that of the edge 202. Such structure will prevent the chain from inappropriately engaging with the teeth 20 during shifting movement.

Referring back to FIG. 2, the second set of teeth are located among the first set of teeth 20. The first special tooth 21 is generally structured like one of the first set teeth 20 shown in FIG. 3. However below the root of the first special tooth 21, there is a recess 211 formed in a lateral side of the sprocket frame. The recess 211 is substantially formed from a proceeding tooth 20 (in terms of driving direction) to the sprocket frame below the root of the first special tooth 21. The depth of the recess 211 is preferably not exceed half of the thickness of the sprocket 2.

Figure 4A:
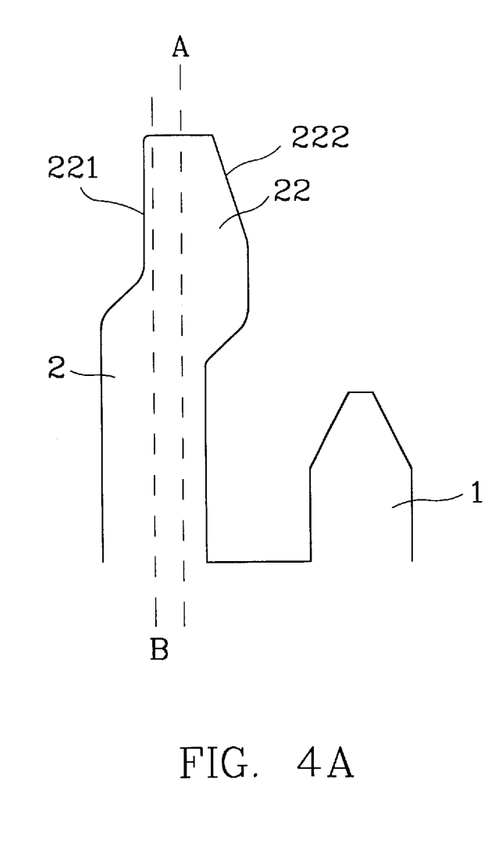
FIG. 4A is a sectional view of a preferred embodiment of a second special tooth 22 (taken along line 555—555 of FIG. 2).

The second special tooth 22 is located next to the first special tooth 21 (in terms of driving direction) and is served as an engaging tooth for the chain (not shown in the figures) when shifting from the small sprocket to the large sprocket. FIG. 4A shows one of the preferred embodiments of the second special tooth 22. It is indently formed toward the small sprocket 1 with the first center line A of the second special tooth 22 located between the small sprocket 1 and the second center line B of the large sprocket 2. The lateral side facing the small sprocket 1 has an inclined cut off angle 222 while the opposite lateral side 221 is substantially parallel with the second center line B. Therefore during shifting movement from the small sprocket 1 to the large sprocket 2, the chain may easily engage with the second special tooth 22.

Figure 4B:
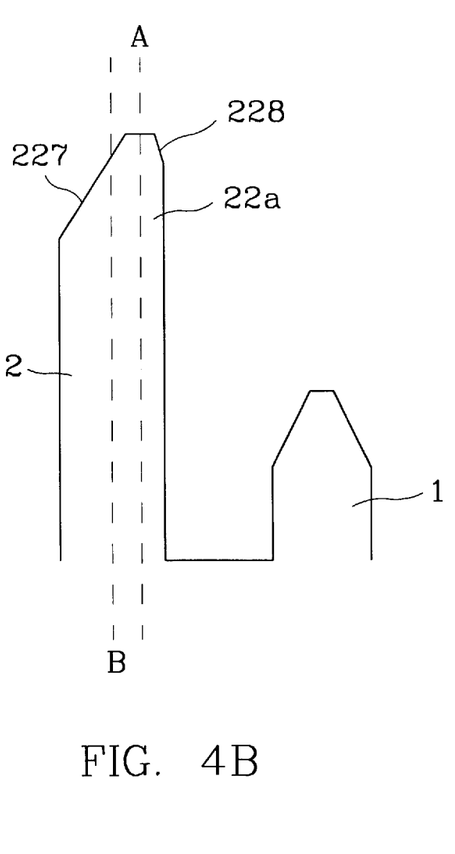
FIG. 4B is a sectional view of another embodiment of a second special tooth 22a similar to FIG. 4A.

FIG. 4B shows another embodiment of the second special tooth 22a. The lateral side of the second special tooth 22a facing the small sprocket 1 has a shallow cut off angle 228 while the opposite lateral side has a larger cut off angle 227. Therefore the first center line A of the second tooth 22a is shifted to locate between the small sprocket 1 and the second center line B of the large sprocket 2. Such a structure also enables the chain to engage with the tooth 22a easily during shifting movement.

Figure 4C:
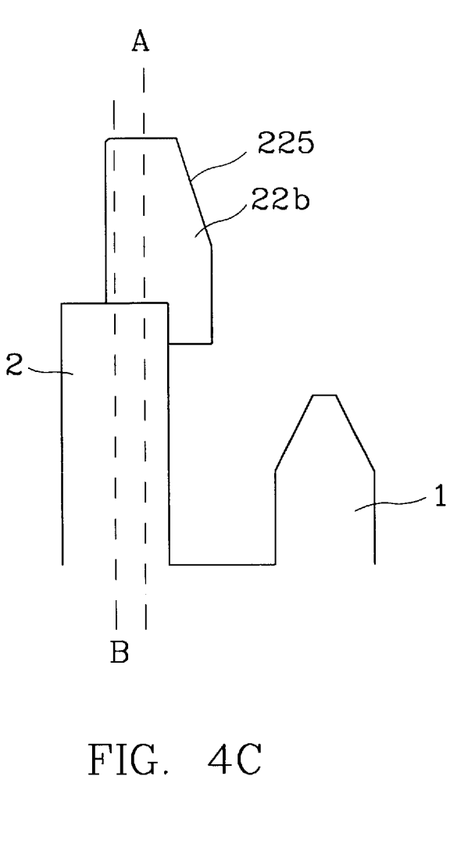
FIG. 4C is a sectional view of a further embodiment of a second special tooth 22b similar to FIG. 4A.

FIG. 4C shows a further embodiment of the second special tooth 22b. It may be formed as an auxiliary tooth affixed to the large sprocket 2 on a lateral side facing the small sprocket 1. The first center line A of the second special tooth 22b is thus located between the small sprocket 1 and the second center line B of the large sprocket 2. There is an inclined cutoff surface 225 on the lateral side facing the small sprocket 1. Therefore the chain may easily engage with the tooth 22b during shifting movement.

The third special tooth 23 is next to the second special tooth 22 (as shown in FIG. 2). The third special tooth 23 has its top portion trimmed and structured about 1–4 mm and is thus shorter than a regular tooth. Next to the third special tooth 23, it may be provided with a fourth special tooth 24 and a fifth special tooth 25 which are also being truncated at the top but at a lesser degree (i.e., with a higher tooth body than tooth 23). Their function will be explained later on.

Figure 5:
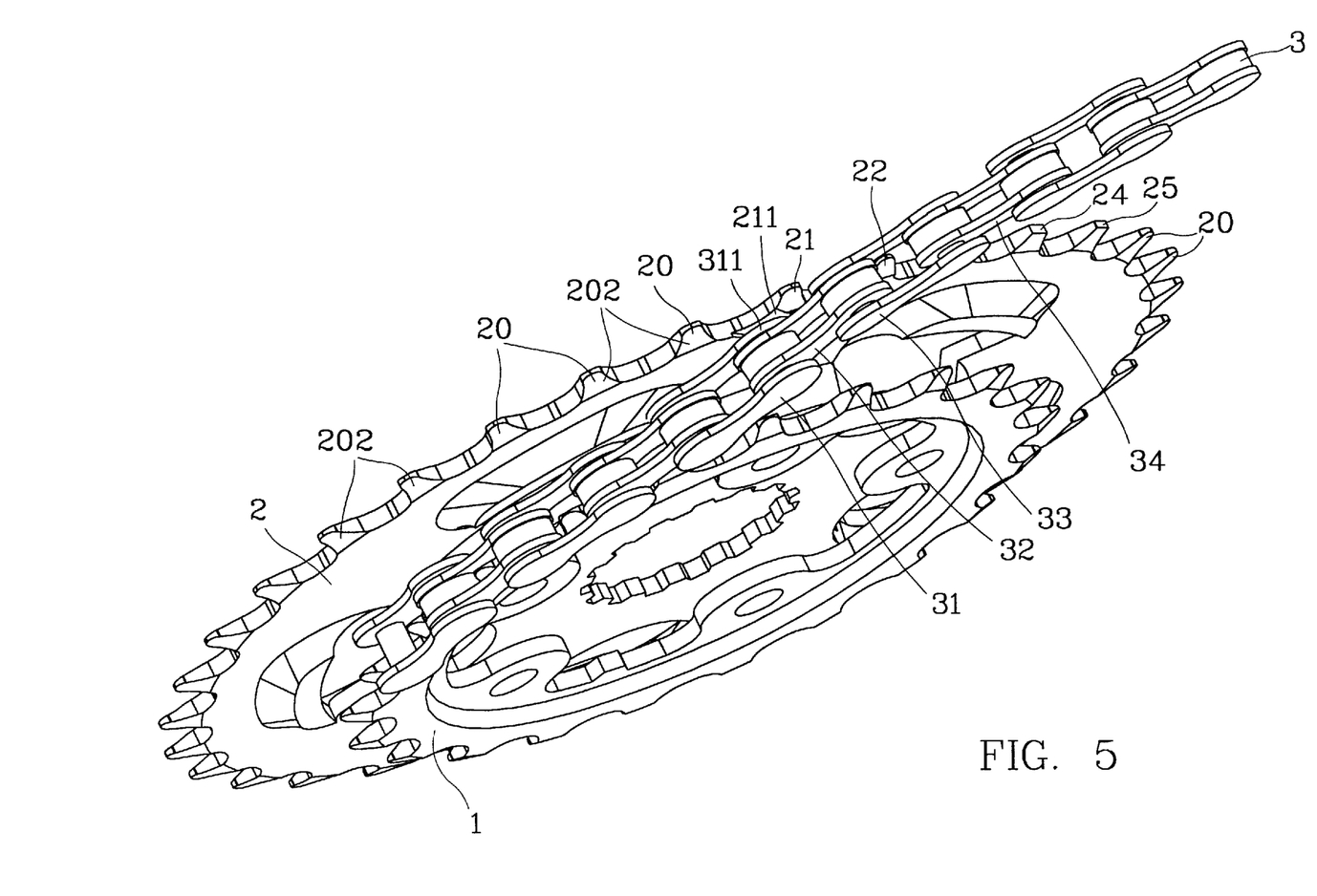
FIG. 5 is a pictorial view of this invention during shifting movement.
Figure 6:
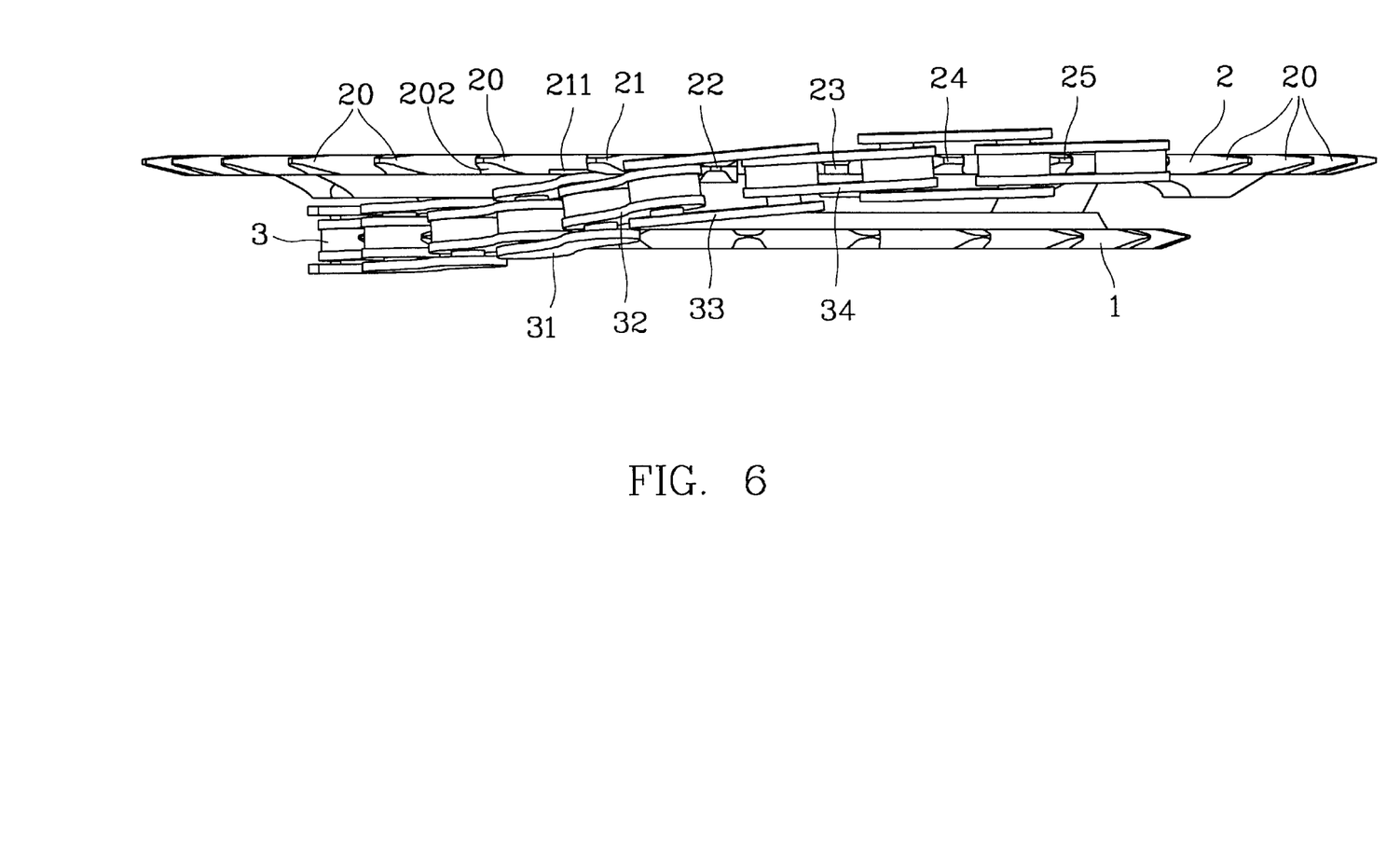
FIG. 6 is a top view of this invention in use.

FIGS. 5 and 6 illustrate shifting movement of the chain 3 from the small sprocket 1 to the large sprocket 2. Chain 3 is a closed loop formed by pairs of outer link plates 31 engaging alternately with pairs of inner link plates 32. During shifting movement, a derailleur (not shown) guides the chain 3 moving slantly from the small sprocket 1 to the large sprocket 2. When the chain 3 is moving against the first set of regular teeth 20, as the first center line A is located on the other side of the second center line B in terms of the small sprocket 1, and the cutting surface 202 has a large angle, the chain 3 disengaging from the small sprocket normally will not engage with the large sprocket 2 at teeth 20.

However during shifting movement, the slantly moving chain 3 moves to the second set of teeth, the recess 211 of the first special tooth 21 allows the leading edge 311 of the outer link plate 31 to slip in without causing interference, the outer link plate 31 and the inner link plate 32 hence may further move toward the large sprocket 2. As the second special tooth 22 has its first center line A bias to the small sprocket 1, the outer link plate 31 can engage with the second special tooth 22 easily and smoothly without the need of raising the chain 3.

Figure 7:
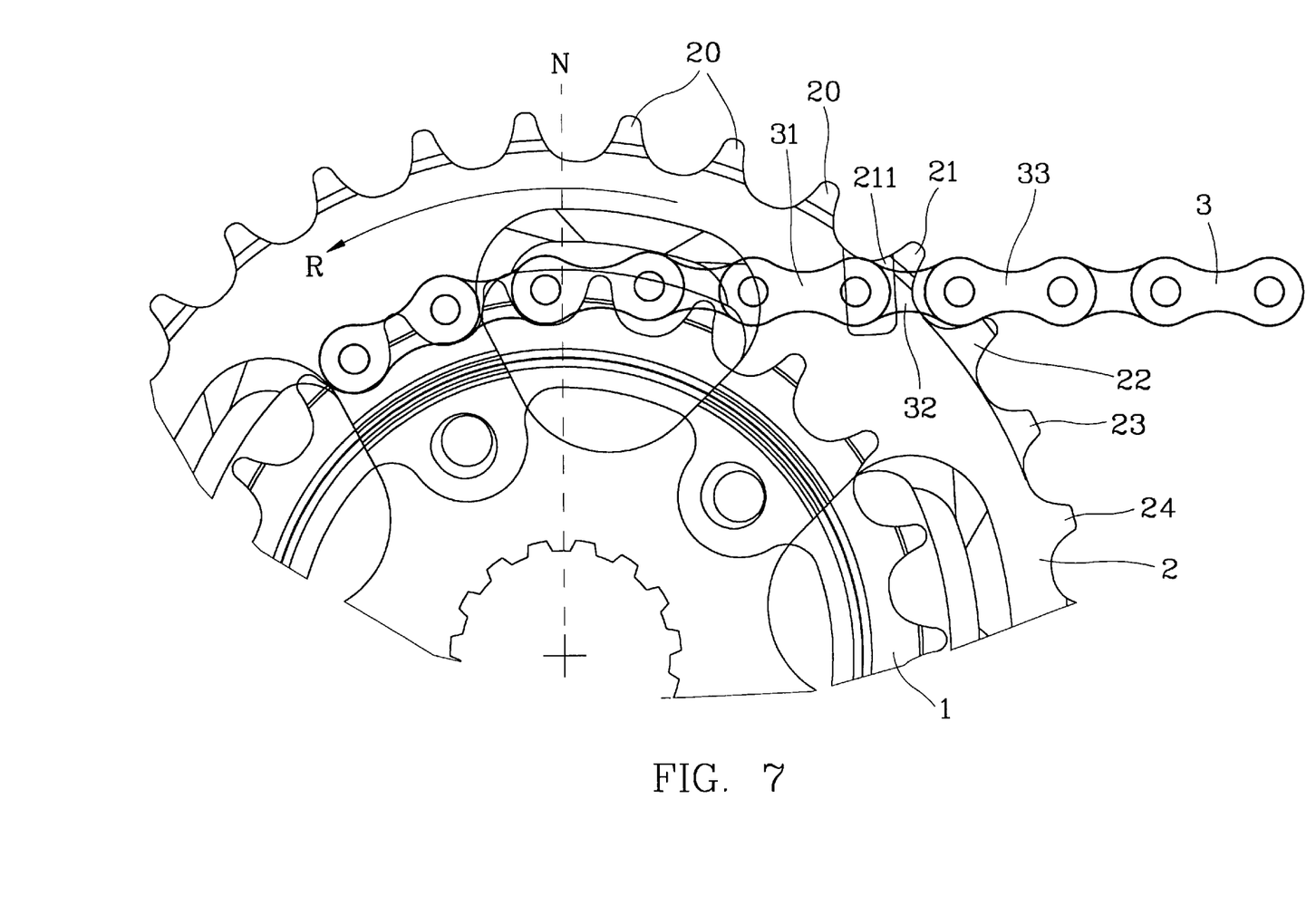
FIG. 7 is a front view schematically showing a first shifting path from the small sprocket to the large sprocket.
Figure 8:
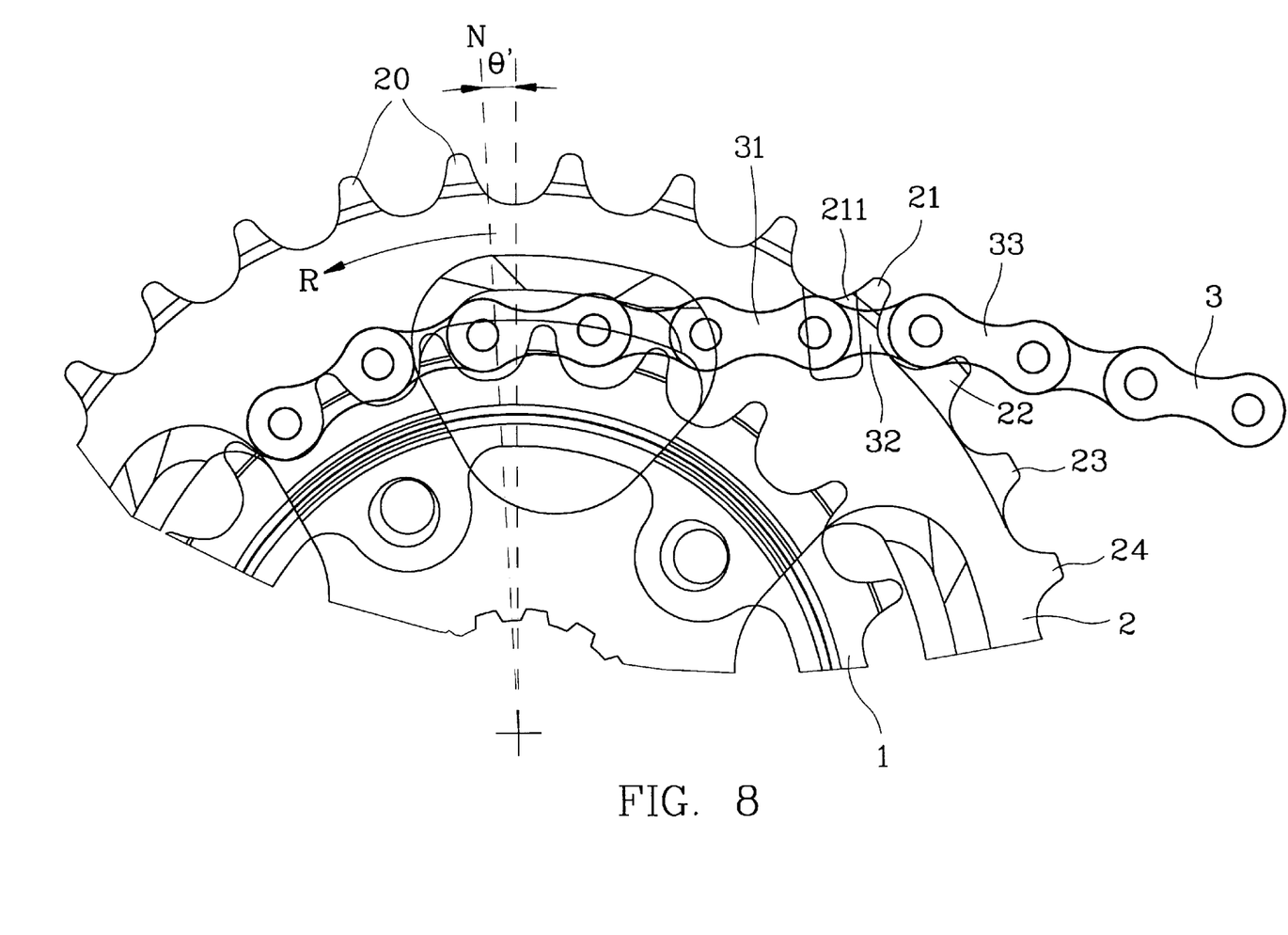
FIG. 8 is another front view schematically showing the first shifting path shown in FIG. 7 (after rotating an angle θ').

FIGS. 7 and 8 further explain the shifting movement of this invention. Wherein FIG. 7 schematically illustrates the associated positions of the chain 3 and the sprockets 1,2 when the chain shifting process is started, while FIG. 8 illustrates the associated positions of the chain 3 and the sprockets 1,2 when the chain shifting process is completed (after rotating an angle θ'). Chain 3 is at a position of engaging with the large sprocket 2. R is the driving direction, N is the shifting base line. As a result of the novel features of the present invention, the shifting movement can be readily accomplished by rotating the large sprocket 2 a very small angle θ'. Eventually, the shifting angle θ' is almost zero for the outer link plate 33 of the chain 3 to engage with the second special tooth 22. The chain 3 needs not to be raised, and the tension of the chain 3 also does not change during shifting. As the second special tooth 22 is offset laterally, the shifting and engagement is done swiftly and securely without bumping.

There is an occasion when the inner link plates 32 reaches the first special tooth 21, it becomes the second shifting path.

For a conventional shifting sprocket, the shifting movement shall be suspended. The sprockets have to rotate for another cycle until the outer link plate reaching the engaging tooth of the large sprocket, i.e., the first shifting path, to perform the shifting movement. It thus reduces the shifting efficiency. However for this invention, because of the existence of the recess 211, the chain 3 can still tilt snugly toward the large sprocket 2 even with the inner link plate 32, and with the offsetting of the second special tooth 22 and the truncated third special tooth 23, the chain 3 can still complete shifting movement even of the second shifting path. It therefore can improve shifting efficiency.

Figure 9:
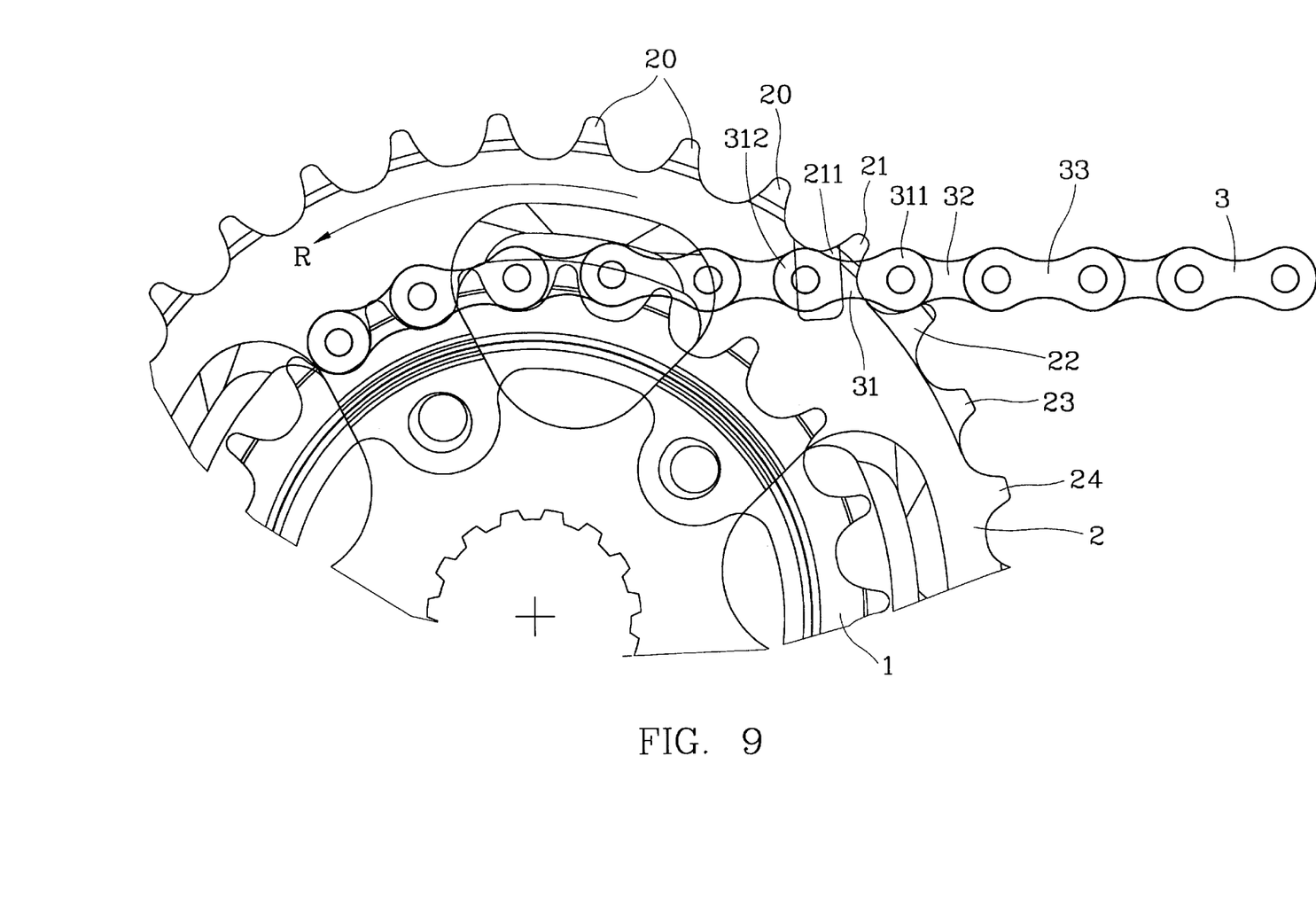
FIG. 9 is a front view schematically showing a second shifting path from the small sprocket to the large sprocket (chain shifting process starts).
Figure 10:
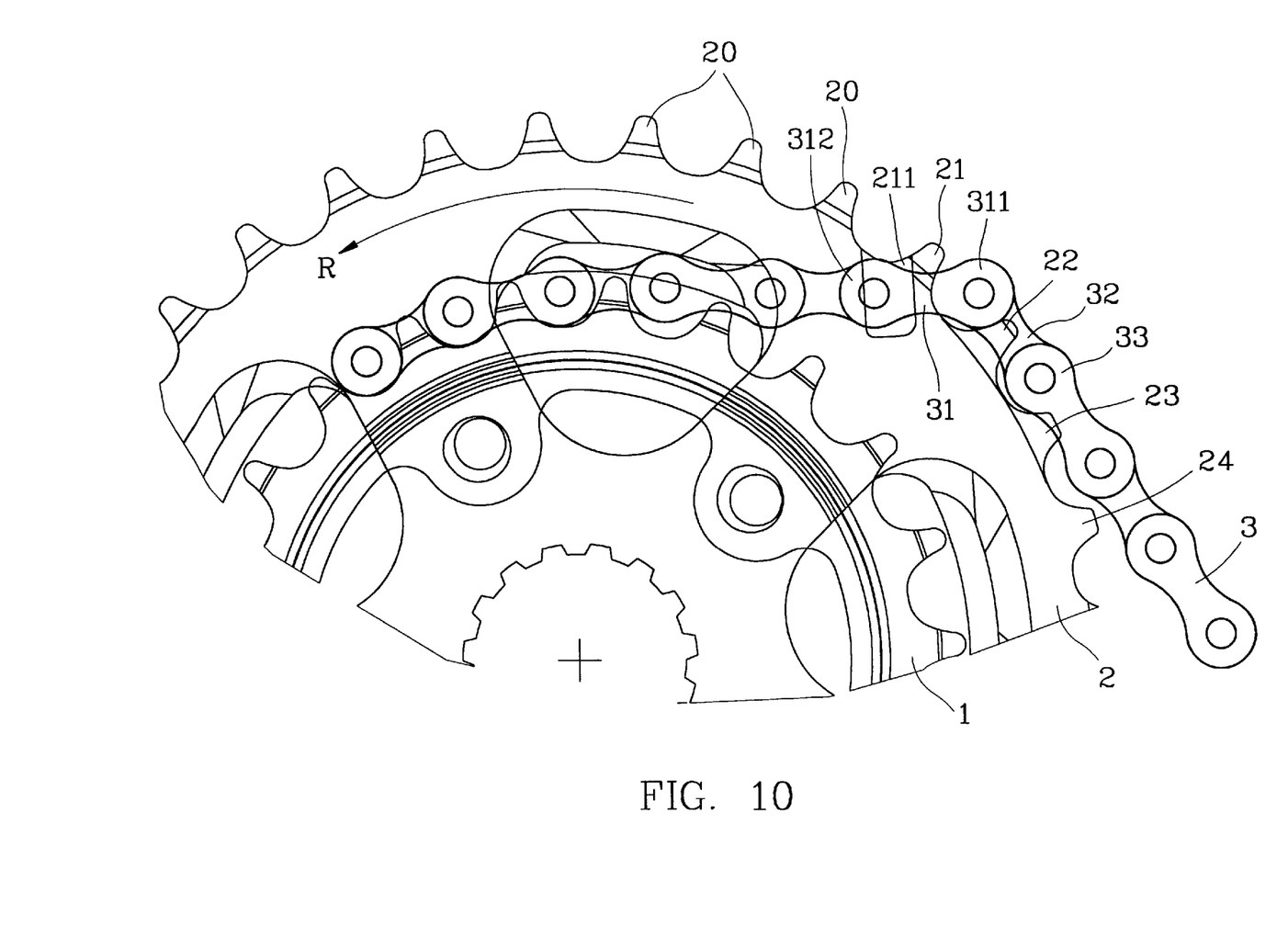
FIG. 10 is another front view schematically showing the second shifting path shown in FIG. 9 (chain shifting process complete).

FIGS. 9 and 10 further explain the shifting movement in the second shifting path. FIG. 9 is generally similar to FIG. 7, except that link plates 31, 32, 33 and 34 move advance for another pitch. The leading edge 311 of the outer link 31 does not engage with the recess 211 and making the following outer link 33 cannot engage with the second special tooth 22. The second special tooth 22(offset tooth)props the leading edge 311 and forces the chain 3 to perform shifting movement at the location of the second special tooth 22.

Referring to FIG. 10, after the leading edge 311 of the outer link 31 being popped by the second special tooth 22, with the continuous rotation of the sprockets 1 and 2, the inner link 32 will bend toward the lateral surface of the second special tooth 22 facing the small sprocket 1, therefore the following outer link 33 may engage with the third special tooth 23. At this stage, the chain 3 is under tension and is slantly tilted toward the large sprocket 2 under the force of the derailleur, it is possible to have interference between the outer link 33 of the chain 3 and the tip portion of the third special tooth 23 resulting from pitch variation of the chain 3 and the large sprocket 2. However the truncated third special tooth 23 can successfully avoid the interference with the slantly moving links 33 and 34 during shifting movement. The outer link 33 may also engage with the third special tooth 23 easily. The provision of the fourth and fifth special teeth 24 and 25 with decreasing truncated teeth may further improve shifting effectiveness, i.e., to enable the following links of the chain to engage more securely with the large sprocket 2. Therefore, because of the special teeth 21, 22 and 23, the chain may be guided to complete shifting movement more effectively and efficiently at the second special tooth 22, whether it is at the first or second shifting path.

Figure 11:
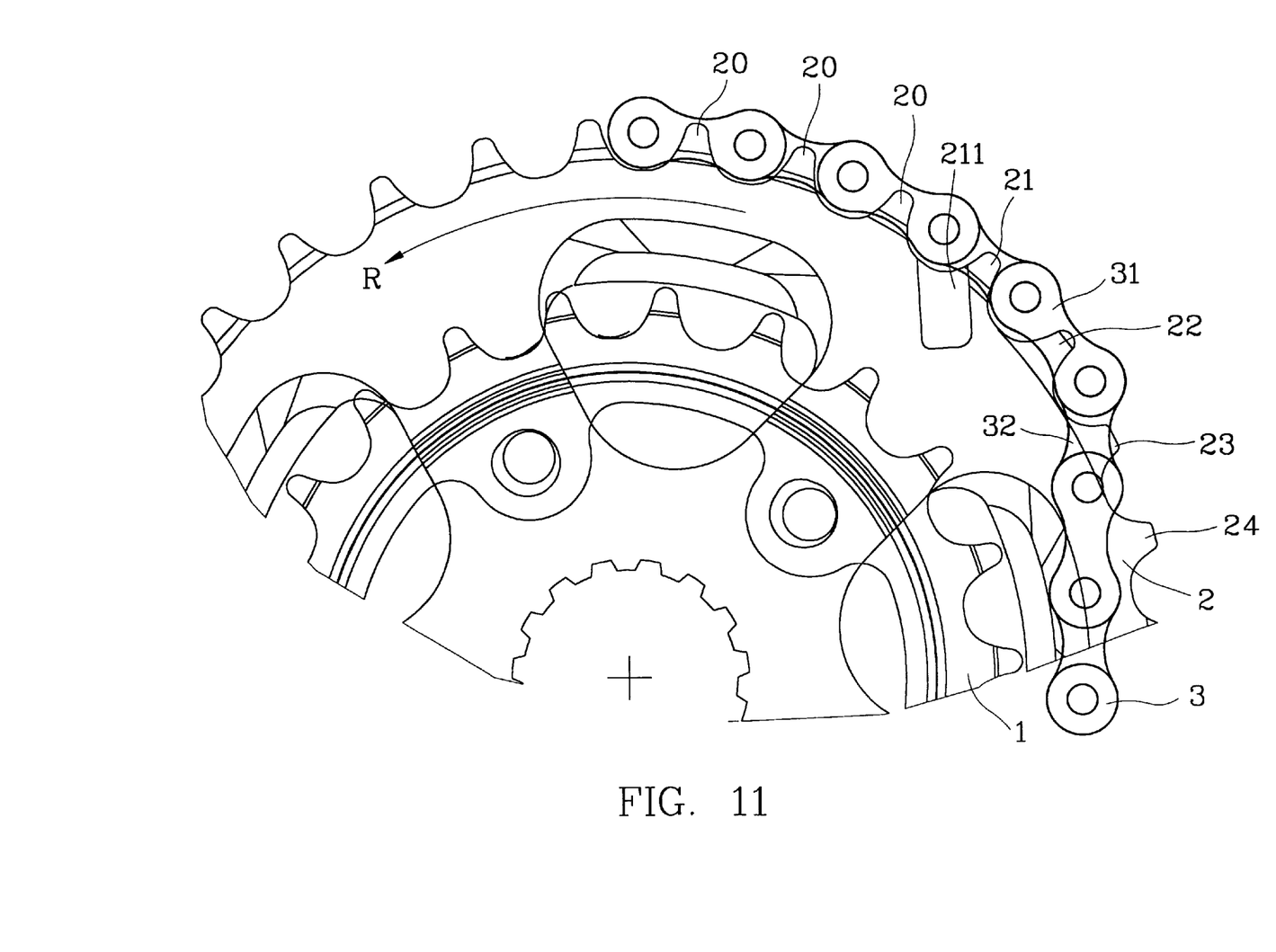
FIG. 11 is a front view schematically showing a first chain shifting path from the large sprocket to the small sprocket.

Referring to FIG. 11, when the chain 3 shifts from the large sprocket 2 down to the small sprocket 1 under the guidance of a derailleur (not shown) in a first shifting path situation, the outer link 31 engaging with the second special tooth 22. Because tooth 22 is offset toward the small sprocket 1, the outer link 31 may also move toward the small sprocket 1. The following inner link 32 may easily disengage with the truncated third special tooth 23. The following links of the chain may easily disengage with the following teeth after the tooth 23 to complete shifting movement.

Figure 12:
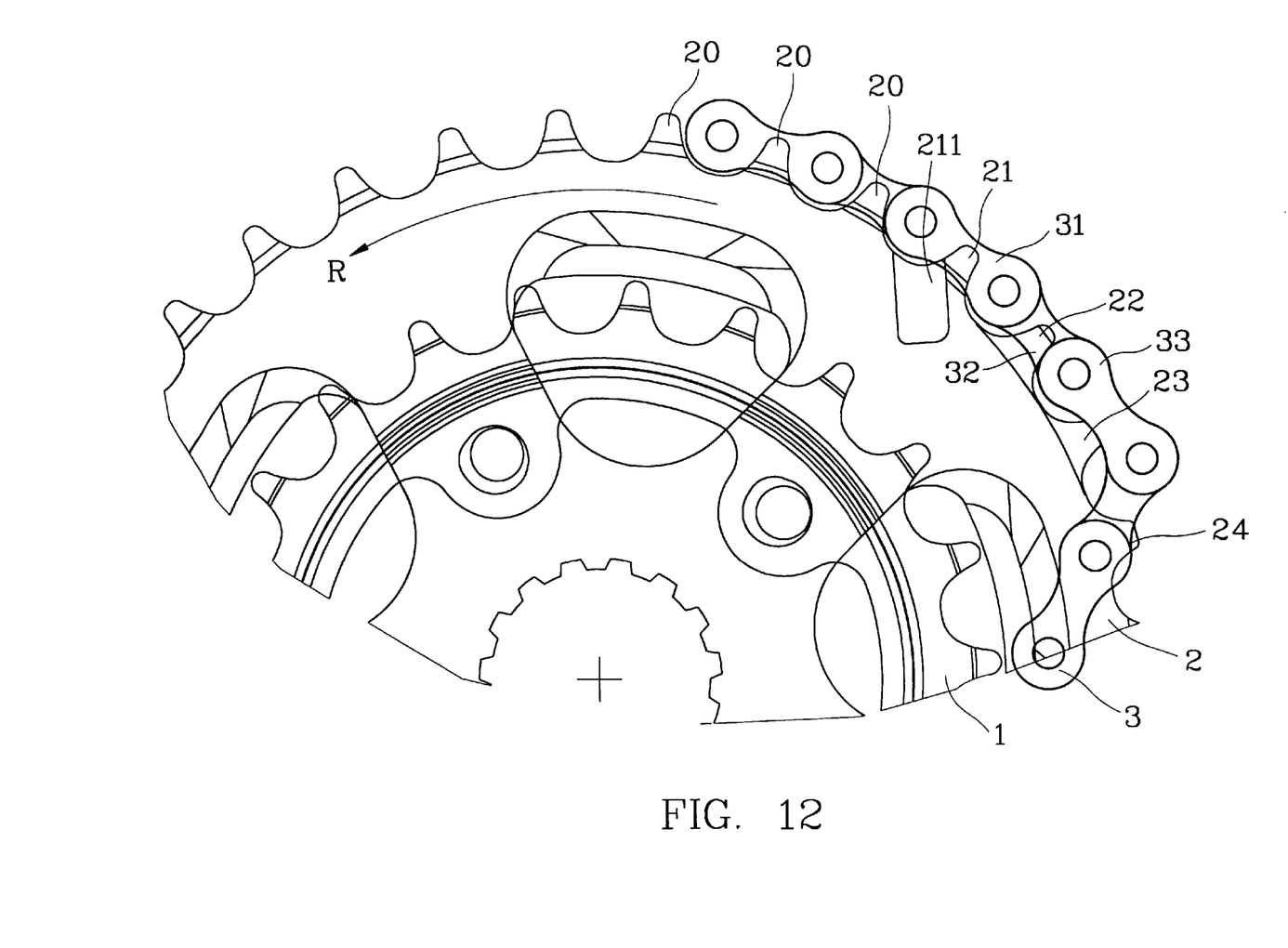
FIG. 12 is a front view schematically showing a second chain shifting path from the large sprocket to the small sprocket.

FIG. 12 schematically shows another situation when the chain 3 shifts from the large sprocket 2 down to the small sprocket 1 under the guidance of a derailleur (not shown) in the second shifting path. In this case, the links 31 and 32 are substantially moved backward for a pitch. The inner link 32 engages with the second special tooth 22 and moves shiftily sideward due to the offsetting of the tooth 22. The outer link 33 cannot completely disengage with the third special tooth 23. However, since the upper portion of the third special tooth 23 is truncated, the third special tooth 23 can props the outer link 33 and forces the chain 3 to move sidewardly to the small sprocket 1 at a greater extent. Therefore the fourth and fifth special teeth 24 and 25 may disengage with the chain more easily to complete the shifting movement from the large sprocket 2 to the small sprocket 1 without interference. It thus may be seen, because of the special teeth 21, 22 and 23, with assistance of the special teeth 24 and 25, the shifting movement may be effectively performed at the tooth 22, whether it is shifting up or down, or under the first or second shifting path.

It summary, in the large sprocket of this invention, there are provided at least two sets of teeth. The first set of teeth each has its first center line offset from the second center line of the large sprocket and is away from the small sprocket, so that the chain will be prevented from engaging with the first set of teeth during shifting movement. The second set of teeth includes at least three consecutive special teeth. The first special tooth has a recess formed in a lateral side facing the small sprocket under the root thereof. The second tooth has its first center line offset toward the small sprocket. The third special tooth is truncated at the top end. Because of this structure and arrangement, the shifting movement may be accomplished efficiently and smoothly at the special teeth location either under first or second shifting path, and perform equally well for shifting up or down.

While the preferred embodiment of the invention has been set forth for purpose of disclosure, modifications of the disclosed embodiment of the invention as well as other embodiment thereof may occur to those skilled in the art. Accordingly, the appended claims are intended to cover all embodiments which do not depart from the spirit and scope of the invention. For example, a plurality of the second sets of teeth may be disposed in various locations of the first set of teeth. Each second set of teeth may includes at least three consecutive special teeth set froths above. Then shifting movement may be performed at different phase angle of the sprocket and at the fixed location of the second special tooth 22.

We claim:

1. A multi-stage sprocket assembly for bicycle to perform chain shifting movement, comprising:

a small sprocket, and a large sprocket having at least a first special tooth and a second special tooth located next to the first special tooth in terms of driving direction;

the first special tooth having a recess formed in a lateral side facing the small sprocket and under the root thereof for avoiding interference with the chain during the chain shifting process, the large sprocket defining a second center line running across the large sprocket radially and being a center line of thickness thereof, the second special tooth defining a first center line running across a tooth crest thereof and parallel with the second center line and being offset toward the small sprocket.

2. A multi-stage sprocket assembly for bicycle of claim 1, wherein the second special tooth is an offset tooth which is laterally shifted toward the small sprocket with the first center line moving away from the second center line of the large sprocket and toward the small sprocket to facilitate engagement with the chain during shifting movement.

3. A multi-stage sprocket assembly for bicycle of claim 2, wherein the second special tooth has a lateral surface parallel to the second center line on the side opposite to the small sprocket.

4. A multi-stage sprocket assembly for bicycle of claim 1, wherein the second special tooth has a large angle cutoff on a lateral side opposite to the small sprocket and has a small angle cutoff on a lateral side facing the small sprocket such that the first center line is moved away from the second center line of the large sprocket and toward the small sprocket.

5. A multi-stage sprocket assembly for bicycle of claim 1, wherein the first special tooth has a small angle cutoff on a lateral side opposite to the small sprocket and has a large angle cutoff on a lateral side facing the small sprocket for preventing the chain from engaging with the first special tooth.

6. A multi-stage sprocket assembly for bicycle of claim 1, wherein all teeth other than the second special tooth each has a small angle cutoff on a lateral side opposite to the small sprocket and has a large angle cutoff on a lateral side facing the small sprocket for preventing the chain from engaging therewith.

7. An improvement of multi-stage sprocket assembly for bicycle including at least a small sprocket and a large sprocket with a derailleur to guide a chain for shifting movement between the small sprocket and the large sprocket, said multi-stage sprocket assembly comprising:

at least three consecutive special teeth in the large sprocket; the first special tooth has a recess formed in a lateral side facing the small sprocket and under the root thereof for avoiding interference with the chain, the second special tooth is offset laterally toward the small sprocket, and the third special tooth is truncated at a top portion thereof.

8. An improvement of multi-stage sprocket assembly for bicycle of claim 7, wherein the second special tooth has a vertical lateral surface on the side opposite to the small sprocket.

9. An improvement of multi-stage sprocket assembly for bicycle of claim 7, wherein the third special tooth is truncated at a top portion in a range of about 1.0 mm to 4.0 mm.

10. An improvement of multi-stage sprocket assembly for bicycle of claim 7, wherein the first special tooth has a large angle cutoff on a lateral side opposite to the small sprocket and has a small angle cutoff on a lateral side facing the small sprocket for avoiding engagement with the chain.

11. An improvement of multi-stage sprocket assembly for bicycle of claim 7, wherein the large sprocket has a plurality of the first special tooth located in different phase angles thereof, each first special tooth having a second special tooth next to it, each second special tooth having a third special tooth next to it for shifting movement use.

12. An improvement of multi-stage sprocket assembly for bicycle of claim 7, wherein the large sprocket further having a fourth special tooth next to the third special tooth with a less truncated portion than the third special tooth, and a fifth special tooth next to the fourth special tooth with a less truncated portion than the fourth special tooth and with a tooth height slightly less than that of a regular large sprocket tooth other than the special teeth.

13. An improvement of multi-stage sprocket assembly for bicycle of claim 12, wherein all teeth other than the second, third, fourth and fifth special teeth each has a small angle cutoff on a lateral side opposite to the small sprocket and has a large angle cutoff on a lateral side facing the small sprocket for preventing the chain from engaging therewith.

* * * * *